(12) United States Patent
Riede et al.

(10) Patent No.: US 11,890,675 B2
(45) Date of Patent: Feb. 6, 2024

(54) ARRANGEMENT FOR ADJUSTING A POWDER FLOW IN RELATION TO THE CENTRAL LONGITUDINAL

(71) Applicants: FRAUNHOFER-GESELLSCHAFT ZUR FOERDERUNG DER ANGEWANDTEN FORSCHUNG E.V., Munich (DE); TECHNISCHE UNIVERSITAET DRESDEN, Dresden (DE)

(72) Inventors: Mirko Riede, Freital (DE); Frank Brueckner, Dresden (DE); Rico Hemschik, Hohenstein (DE); Robin Willner, Dresden (DE)

(73) Assignees: FRAUNHOFER-GESELLSCHAFT ZUR FOERDERUNG DER ANGEWANDTEN FORSCHUNG E.V., Munich (DE); TECHNISCHE UNIVERSITAET DRESDEN, Dresden (DE)

( * ) Notice: Subject to any disclaimer, the term of this patent is extended or adjusted under 35 U.S.C. 154(b) by 312 days.

(21) Appl. No.: 16/969,272

(22) PCT Filed: Feb. 13, 2019

(86) PCT No.: PCT/EP2019/053541
§ 371 (c)(1),
(2) Date: Aug. 12, 2020

(87) PCT Pub. No.: WO2019/158580
PCT Pub. Date: Aug. 22, 2019

(65) Prior Publication Data
US 2021/0046708 A1    Feb. 18, 2021

(30) Foreign Application Priority Data

Feb. 13, 2018 (DE) .................... 10 2018 202 203.8

(51) Int. Cl.
*B22F 12/50* (2021.01)
*B22F 10/25* (2021.01)
(Continued)

(52) U.S. Cl.
CPC .............. *B22F 10/25* (2021.01); *B22F 10/31* (2021.01); *B22F 12/41* (2021.01); *B22F 12/44* (2021.01);
(Continued)

(58) Field of Classification Search
CPC ....................................................... B22F 12/50
See application file for complete search history.

(56) References Cited

U.S. PATENT DOCUMENTS

| 539,633 A | 5/1895 | Murphy |
|---|---|---|
| 6,046,426 A | 4/2000 | Jeantette et al. |

(Continued)

FOREIGN PATENT DOCUMENTS

| CN | 201071393 | 6/2008 |
|---|---|---|
| CN | 101264519 | 9/2008 |

(Continued)

OTHER PUBLICATIONS

International Search Report.
(Continued)

*Primary Examiner* — Christopher S Kessler
(74) *Attorney, Agent, or Firm* — Jacobson Holman PLLC

(57) ABSTRACT

An arrangement for adjusting a powder flow in relation to the central longitudinal axis of an energy beam for a working head which is formed for powder application welding. There is a device for the two-dimensional or three-dimensional alignment of the powder supply in relation to the central longitudinal axis of the energy beam in a plane oriented at right angles to the central longitudinal axis of the energy beam. From one side, a linear beam is directed to the region (Continued)

in which the particles of the powdery material meet one another. At right angles thereto, there is arranged an optical detector array for locally resolved detection of intensities connected to an electronic evaluation unit designed to determine the shape, size and/or length of an irradiated region in which locally resolved intensities which exceed a predefinable threshold have been detected with the optical detector array. The irradiated region reaches from the surfaces of particles which the laser beam strikes with reduced power during the adjustment as far as a sub-region of the irradiated region which is arranged in the direction of a workpiece surface of accelerated powdery particles, in which the particles heated by the laser beam move divergently.

9 Claims, 5 Drawing Sheets

(51) Int. Cl.
| | |
|---|---|
| *B33Y 30/00* | (2015.01) |
| *B22F 12/90* | (2021.01) |
| *B33Y 10/00* | (2015.01) |
| *B22F 12/41* | (2021.01) |
| *B22F 12/44* | (2021.01) |
| *B22F 12/53* | (2021.01) |
| *B22F 10/31* | (2021.01) |
| *B22F 12/47* | (2021.01) |
| *B22F 12/55* | (2021.01) |

(52) U.S. Cl.
CPC .............. *B22F 12/50* (2021.01); *B22F 12/53* (2021.01); *B22F 12/90* (2021.01); *B33Y 10/00* (2014.12); *B33Y 30/00* (2014.12); *B22F 12/47* (2021.01); *B22F 12/55* (2021.01)

(56) References Cited

U.S. PATENT DOCUMENTS

| | | | |
|---|---|---|---|
| 6,476,343 | B2 | 11/2002 | Keicher et al. |
| 2012/0199564 | A1 | 4/2012 | Washko et al. |
| 2016/0318130 | A1 | 11/2016 | Stempfer et al. |
| 2017/0087666 | A1 | 3/2017 | Sasaki et al. |
| 2017/0239724 | A1 | 8/2017 | Diaz et al. |

FOREIGN PATENT DOCUMENTS

| | | |
|---|---|---|
| CN | 102245343 | 11/2011 |
| DE | 102004051876 | 4/2006 |
| DE | 102004057799 | 6/2006 |
| EP | 1693141 | 8/2006 |
| EP | 1967316 | 9/2008 |
| JP | 2016221538 | 12/2016 |
| WO | 2017/114965 | 7/2017 |

OTHER PUBLICATIONS

German Office Action.
Frank Kubish. "Automated Measuring System for Investigation Der Pulverströmung" In: Fraunhofer IWS Annual Report 2016; p. 60, 61; Fraunhofer Institute for Material and Beam Technology ISW Dresen 2017.
Chinese Office Action.
Japanese Office Action.

ARRANGEMENT FOR ADJUSTING A POWDER FLOW IN RELATION TO THE CENTRAL LONGITUDINAL

BACKGROUND OF THE INVENTION

Powder deposition welding is a method with which coatings can be formed on surfaces of workpieces, for example in order to obtain coatings with specific advantageous properties or to compensate for wear-induced material removal on components. However, powder deposition welding methods can also be used to form three-dimensional components or contours.

Powdery, generally metallic material is used and melted with the energy of an energy beam, in most cases the energy of a laser beam, so that after the material has solidified, the coating or the three-dimensional contour can be formed one above the other with multiple coatings.

Powdery materials are cost-intensive, with the result that powder losses are avoided and maximum utilization of conveyed powdery material is envisaged.

Usually, working heads in which powder conveyance, powder feed, and optical components for influencing a laser beam as an energy beam are accommodated are used.

An energy beam is here usually directed centrally through the working head and perpendicularly toward a surface on which a material is to be deposited. For reasons of effectiveness, powdery material is fed in such a way that it is fed into the sphere of influence of the energy beam from all sides and, if possible, simultaneously from the outside. An annular feed enclosing the energy beam is preferred.

For this purpose, powder feeds are designed in such a way that powdery material is fed, via an annular gap nozzle, a plurality of annularly arranged nozzles or oppositely arranged nozzles that are directed at one another, in a region that is arranged above the plane in which the actual material deposition with the solidified material is to take place. For this purpose, an annular gap nozzle is usually used, which is embodied to be conical in the direction of the plane in which the actual material deposition with the solidified material is to take place. Several annularly arranged nozzles can be oriented so as to be inclined in accordance with the cone. It is also possible to use at least two oppositely arranged nozzles that are inclined at an angle and the outlet openings of which face one another on a powder feed.

As a result, powder conveyed in this way flows out of the nozzle(s) and particles of the powdery material flow toward one another from several directions at an acute angle into a region. This region is arranged above a surface on which a material is deposited. In this region, an interaction takes place as a result of the absorption of the energy radiation at the individual particles, which consequently heat up in part to above the melting temperature and, in the weld pool produced, liquid material strikes the surface on which a material is to be deposited and solidifies there.

In the region of the interaction of the powder with the energy beam, the powder is preheated and then absorbed in the weld pool generated by the energy beam. The position of the laser beam correlates to the position of the weld pool.

In the case of such a concentric powder feed into the region of influence of the energy beam in which the interaction takes place, it is important that symmetric relationships are maintained. This applies in particular to the alignment of the central longitudinal axis of the energy beam. For a laser beam, this is the optical axis. The central longitudinal axis should be arranged at the center or in the middle in said region. Even in the case of small lateral displacements of the central longitudinal axis of the energy beam from the center of the region in which the particles of the fed powdery material meet, a deterioration in the quality of the deposited material arises or problems with adhesion occur. In addition, this displacement has a disadvantageous effect in that a smaller proportion of the powder fed is absorbed in the weld pool and can thus be used for the deposition of material, thereby reducing the coating or deposition rate. Consequently, powder losses occur, and it is desirable to avoid those.

FIGS. 1 and 2 show in schematic form in a sectional view how a powder feed is centered (FIG. 1) and how an offset of the powder feed in relation to the central longitudinal axis of an energy beam 4 can take place. The effect can be seen in particular in the region 3. FIG. 2 thus shows the effect of a lateral offset of the powder feed to the right. The energy beam 4 strikes conveyed particles of the powdery material on its left side at an earlier point in time than it does on the right side here. There is therefore a significantly more inhomogeneous heating of the powder conveyed into the region 3 than is the case with the central feed according to FIG. 1. In addition, a smaller number of the particles preheated by the energy beam are included in the weld pool.

SUMMARY OF THE INVENTION

So far, this problem has been countered by manual influence during an adjustment and the visual and subjectively colored evaluation by an operator, and therefore errors could not be excluded and, in particular, no comparable adjustment results could be obtained over longer periods or in a case in which the process conditions changed.

It is therefore an object of the invention to provide possibilities for an improved adjustment that is performable in particular objectively and in a comparable manner, which are also capable of being used for an automated solution.

This object is achieved according to the invention by an arrangement having the features of the claims.

In the arrangement according to the invention for adjusting a powder flow in relation to the central longitudinal axis of an energy beam, in particular of a laser beam for a working head which is designed for powder deposition welding, the powder flow is realized by means of a powder feed that is arranged on the side of the working head that faces a workpiece and is formed with an annular gap nozzle, which is embodied to be conical in the direction of the workpiece, with a plurality of annularly arranged nozzles or with at least two oppositely arranged nozzles, which are inclined at an angle and the exit openings of which face one another, and is designed such that the particles of the powdery material meet from several directions at an acute angle in a region which is arranged above a surface on which powdery material melted with the energy of the energy beam is to be deposited.

The energy beam is aligned with respect to the plane on which the molten powdery material is to be deposited. The alignment is preferably perpendicular to said plane.

A device for two-dimensional alignment of the powder feed in relation to the central longitudinal axis of the energy beam, in particular the optical axis of a laser beam, is provided at the working head in a plane oriented perpendicular to the central longitudinal axis of the energy beam.

Starting from a radiation source, electromagnetic radiation is directed as a linear beam from a side onto the region in which the particles of the powdery material meet. An optical detector array, which can preferably be a camera system, is arranged in a plane that is oriented perpendicular to the linear beam.

The optical detector array is designed for spatially resolved capturing of intensities of electromagnetic radiation and is connected to an electronic evaluation unit. In this case, the electronic evaluation unit is designed for ascertaining the shape, size and/or length of an irradiated region in which intensities that exceed a specifiable threshold value have been captured with the optical detector array in a spatially resolved manner.

The irradiated region extends from the surfaces of particles of the powdery material which the energy beam, which is operated with reduced power during the adjustment, strikes up to a partial region of the irradiated region that is arranged in the direction of a workpiece surface accelerated powdery particles, in which the particles heated by the energy beam move divergently. This evaluable region is designed similar to a focused laser beam in the region of its focal plane in terms of the movement of the particles of the powdery material. The particles here move at least similar to focused electromagnetic radiation. In the focal plane and in the vicinity thereof, they form the smallest cross-sectional area, which decreases before striking the focal plane and increases again after the focal plane as a result of divergence. The cross-sectional area here increases quadratically with increasing distance from the focal plane.

The irradiated region should be at least as large as, preferably larger than, the region in which particles meet from different directions and then do not move divergently away from one another and/or the size of the area that is able to be captured with the optical detector array.

The radiation source should emit electromagnetic radiation in a wavelength interval and/or a bandpass filter that is transparent for a wavelength interval should be arranged between the irradiated region and the detector array. The respective wavelength interval should preferably be in the range from 700 nm to 1200 nm and particularly preferably in a wavelength range between 715 nm and 780 nm. Scattering and reflection influences during the detection can thereby be avoided or be considerably reduced. The wavelength of a laser beam that is used as an energy beam should also lie outside said wavelength interval. The wavelength(s) of the linear beam should lie within said wavelength interval.

During the adjustment, the energy beam is operated at a reduced power, preferably at a maximum of 50% of the power used for powder deposition welding, particularly preferably at a maximum of typically 15% of said power. The power should here advantageously be selected only to be sufficiently high for powder particles to heat up to such an extent as a result of the energy transferred from the energy beam to the particles that electromagnetic radiation from the wavelength interval that was selected for the radiation source of the energy beam or for which the bandpass filter was designed is emitted by the particles influenced by the energy beam. Melting of particles should be avoided during an adjustment.

The radiation source with the linear beam should be particularly advantageously movable parallel to the plane in which the detector array is arranged. The spatially resolved capturing and evaluation of the intensities during the movement should be carried out at least in the region of the center of the region in which the particles of the powdery material meet using the correspondingly designed electronic evaluation unit. This is also the center in which the energy beam is to be used in a precisely adjusted position and alignment for powder deposition welding. Of course, capturing can also be carried out in other positions during the movement of said radiation source, as a result of which the desired position in the center, at which an evaluation of the intensities captured in a spatially resolved manner is to take place in any case, can be ascertained more precisely. In this central position, the irradiated region captured using the detector array has its smallest extent.

The electronic evaluation unit can be an optical and/or acoustic indication unit that is able to be used for manual adjustment with the device for the two-dimensional alignment of the powder feed. An operator can in this case be shown in which direction and to what extent a movement on this device is required for an exact adjustment. Alone or in addition to this, the electronic evaluation unit can be designed such that a controlled, automated adjustment of the device for the two-dimensional alignment of the powder feed can be obtained. For this purpose, it is advantageous if the device for the two-dimensional or three-dimensional alignment of the powder feed in relation to the central longitudinal axis of the energy beam is formed with two platforms that are movable independently of one another in two directions aligned perpendicularly to one another and to which the powder feed and/or an optical unit displacing the energy beam parallel to its central longitudinal axis is fixed. The two platforms should each be movable with a drive, preferably a linear drive and particularly preferably with a stepper motor, and should be controllable by the electronic evaluation unit. The electronic evaluation unit can then influence the respective drives accordingly in order to be able to achieve optimum adjustment.

The platforms can preferably also be movable using a third drive in an axial direction (z-axial direction) perpendicular to the directions explained above for a three-dimensional adjustment.

The electronic evaluation unit can also be designed in such a way that the intensity value value of individual captured image points or the number of the captured image points at which the specifiable intensity threshold value has been exceeded that were captured within the irradiated region are ascertained and evaluated. Exceeding or falling below a number of image points in the entire irradiated region or in partial regions of the irradiated region can be used as a statement for carrying out any adjustment that may be required. During the adjustment, a relative movement of the powder feed with the one or more nozzle(s) from which powdery material emerges in relation to the central longitudinal axis of the respective energy beam is effected by means of a device that is designed for this purpose. As a rule, the position of the powder feed is adapted accordingly by a translational movement in particular of the powder feed on a working head in order to achieve optimum conditions for deposition welding.

Alone or in addition to this, pattern recognition can be carried out with the image points captured within the irradiated region. This can preferably be carried out taking into account an optimum pattern. Optimum patterns can be obtained, for example, during calibrations with good, in particular optimum, adjustment and stored in a memory for the pattern recognition and evaluation.

An electronic evaluation unit can also have a memory in which data for the verification of an adjustment having been carried out on a working head can be stored and used with the invention.

When capturing image points within the irradiated region, the respective time (exposure time) during which a simultaneous capturing and then also evaluation of the measurement signals captured with the detector array can be selected such that sufficient accuracy can be achieved. The respective time period for evaluable capturing can be automatically adapted taking into account the image point with the greatest intensity captured in the irradiated region.

While carrying out an adjustment, all process parameters should be kept constant or changing parameters should be taken into account. This relates, for example, to the volume flow and/or the flow velocity of a gas flow which can be fed through the powder feed together with the powdery material. This gas flow has an advantageous influence on powder feed and can optionally also act as a protective gas.

The linear beam should not change its alignment during the adjustment, except for a possible parallel movement, which has already been explained. This also applies to the power with which the radiation source emitting the linear beam and, if appropriate, to the beam-shaping and beam-deflecting elements used for this purpose.

A laser radiation source can advantageously be used for the emission of a linear beam.

To reduce the installation space required, there is the possibility of directing the linear beam onto an element that reflects the linear beam and deflects it. As explained, the reflected linear beam is then directed into the region to be irradiated, in which the particles meet.

Alone or additionally, a reflecting element can likewise be arranged between the detector array and the irradiated region from which the measurement signals are captured with the detector array, with which element the image of the irradiated region is deflected accordingly and directed onto the correspondingly arranged and oriented detector array.

The reflective element(s) with their reflective faces on which the deflection takes place can preferably be oriented at a 45° angle.

As is known, one or more powder nozzle(s) has/have an important influence on the process result when depositing powder—in particular during laser powder deposition welding (LPD). An assessment of the particle flow after the nozzle exit, however, has so far only been possible in independent test systems. With the invention, however, an objective and possibly automatable measurement of the powder flow in relation to the position and alignment of an energy beam within a processing machine can be made possible.

Another disturbance in the region of the powder deposition welding is the geometric deviation of the axes of laser radiation and particle flow. For a constant, direction-independent powder material deposition, a coaxial alignment of the nozzle(s) to the laser optical unit or a central longitudinal axis of an energy beam is necessary, so that the powder can pass into a specific region in the shape of a cone or from two opposite sides under the influence of the energy radiation, especially laser radiation, and can then be melted onto a surface with the energy of an energy beam for a material deposition.

In current LPD systems in particular, however, this setting is effected by manually setting what is known as the adjustment unit. With the aim of automatic alignment, a mechatronic adjustment system could be designed and manufactured with the invention, which enables an adjustable adjustment of the nozzle position(s) with powder feed relative to the central longitudinal axis of an energy beam, in particular of the optical axis of a laser beam. In this way, an incorrect alignment of the powder flow in relation to the central longitudinal axis of an energy beam can be corrected without a subjective influence taking place, as is the case with the manual correction that has been carried out to date.

In combination with a measurement system, an automatic correction of the alignment of the powder flow fed into the region of influence of the energy beam can be carried out by means of at least one nozzle by way of image analysis within the ascertained tolerance limits.

It is possible, in accordance with criteria to be ascertained by a user, to maximize the particle-beam interaction, to achieve a coaxial alignment of the particle and energy beam using image processing algorithms. An automated geometric alignment of particles with respect to an energy beam can be calculated. Then an automatic or manual adjustment can then be achieved by means of a displacement device. The high precision can be even further improved by iterative repetition.

In this way, an in-situ displacement of the powder-applying device (for example a movement of one or more nozzle(s) from which powdered material emerges and enters the region of influence of the energy beam or an adaptation of the cross-sectional region of the energy beam can be carried out.

It is possible to calibrate new nozzle systems, to compensate for the wear of powder-applying systems.

The invention can also be used for the measurement for quality control/wear monitoring and research by fully automatically recording the ascertained characteristic maps, the material-dependent and geometry-dependent characterization of the energy beam-particle interaction for process development.

DESCRIPTION OF THE DRAWINGS

The invention will be explained in greater detail by way of example below.

In the figures.

DETAILED DESCRIPTION OF THE INVENTION

Figure 1:
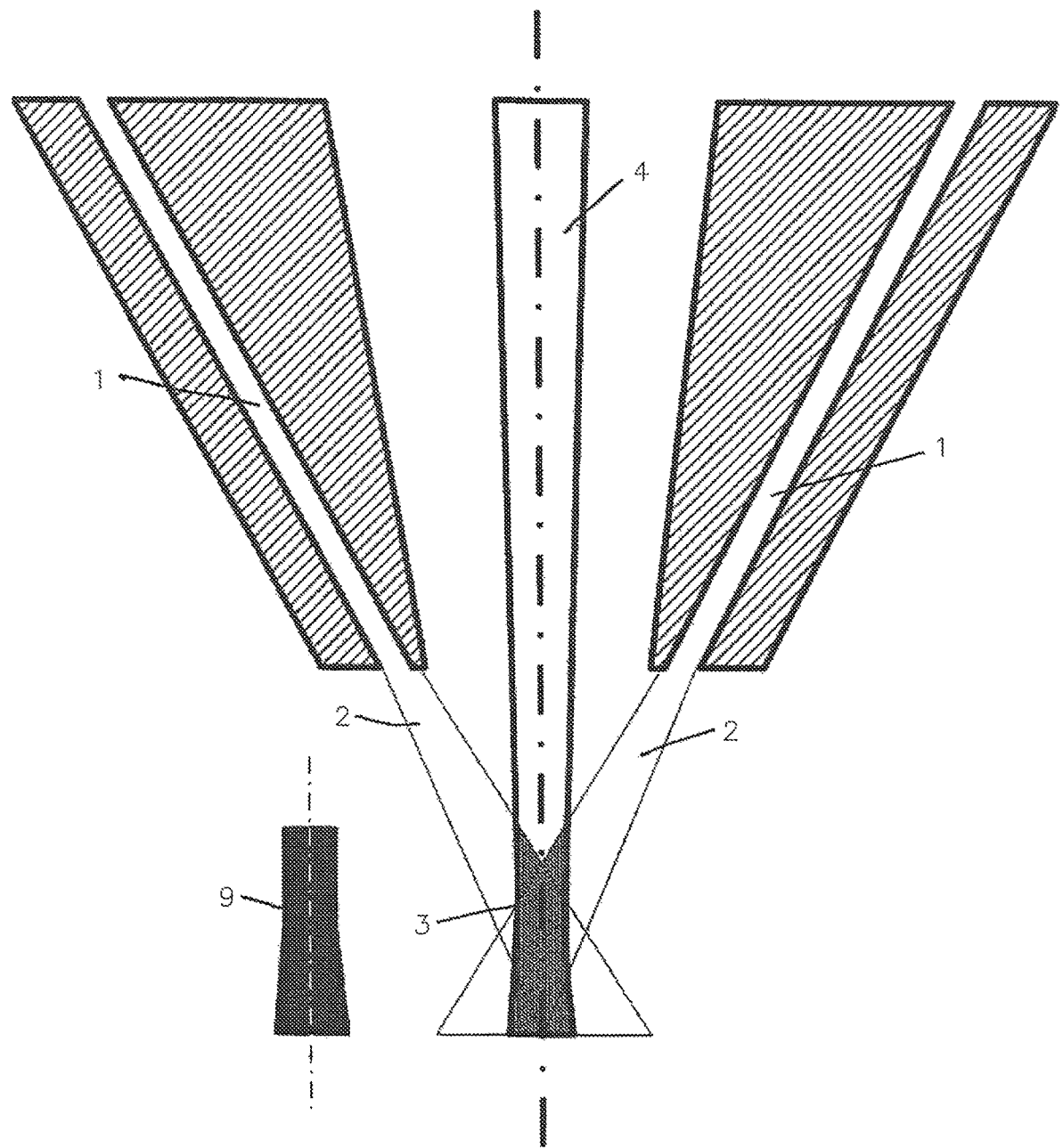
FIG. 1 shows, in schematic form, a sectional view of the feed of powdery material into a region in which particles of the powdery material meet from different directions from a nozzle or from two nozzles of a powder feed, with a correctly adjusted laser beam.
Figure 2:
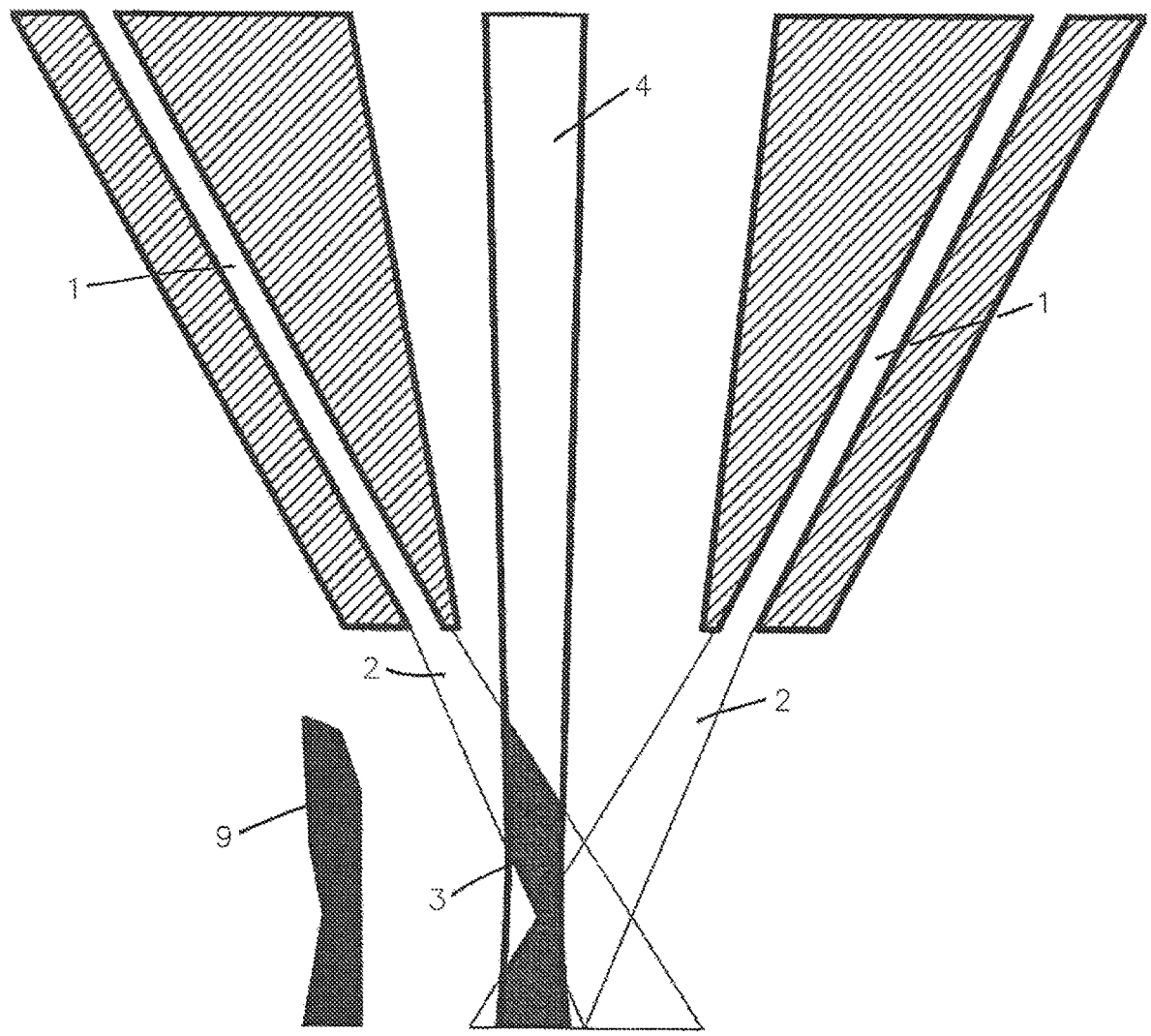
FIG. 2 shows, in schematic form, a sectional illustration of the feed of powdery material into a region in which particles of the powdery material meet from different directions from a nozzle or from two nozzles of a powder feed, with an incorrectly adjusted laser beam.

FIGS. 1 and 2 schematically show the feed of a powdery material through an annular gap nozzle 1, which tapers conically in the direction of a workpiece (not shown) and the region 3. However, there could also be two gap nozzles that are arranged opposite one another and inclined at an angle with respect to one another.

The annular gap nozzle 1 has a constant gap width over its entire length. The powdery material is accelerated in the direction of the workpiece with the aid of a gas flow from the annular gap nozzle 1. Particles which have exited from the annular gap 1 meet in the region 3 from different directions and move at least almost parallel to one another along a specific path before the directions of movement of the particles change divergently. In the region 3 there is also the interaction zone with the laser beam as an example of an energy beam 4. Its optical or central longitudinal axis is illustrated by the dash-dot line.

In the interaction zone, the particles heat up by means of the energy of the laser beam and they are usually partially melted there when a material is deposited in a deposition welding process. The region 3 in which the particles meet, interact with the laser beam, and move parallel to one another is arranged above the surface on which a material is to be deposited.

FIG. 1 shows an alignment of the laser beam and powder feed via the annular gap nozzle 1 with correct adjustment, in which the optical axis of the laser beam is guided through the region 3 exactly in the center.

In the example shown in FIG. 2, the optical axis of the laser beam is displaced laterally, to the left in the illustration, so that asymmetric conditions occur in the region 3 and in the interaction zone. This leads to a non-uniform heating of particles in the region 3 and accordingly to a non-uniform deposition of material on the respective surface. This also reduces the deposition rate of powder per unit area. Thus, part of the particles, which are located further to the right in FIG. 2, cannot be heated and melted sufficiently or does not strike the weld pool, meaning that they cannot be used for a material deposition or a deposition quality in regions of the material deposited is unsatisfactory.

An image of a region 9 for a correct adjustment of the laser beam with respect to the supplied powder flow, which image is captured with a two-dimensional optical detector array (not shown here), is shown separately in FIG. 1, in which symmetric relationships have been maintained.

On the far left in FIG. 2 there is shown schematically an image of a region 9 for an incorrect adjustment of the laser beam to the supplied powder stream, which can be detected with a two-dimensional optical detector array (not shown here) and in which asymmetric relationships have been maintained.

Figure 4:
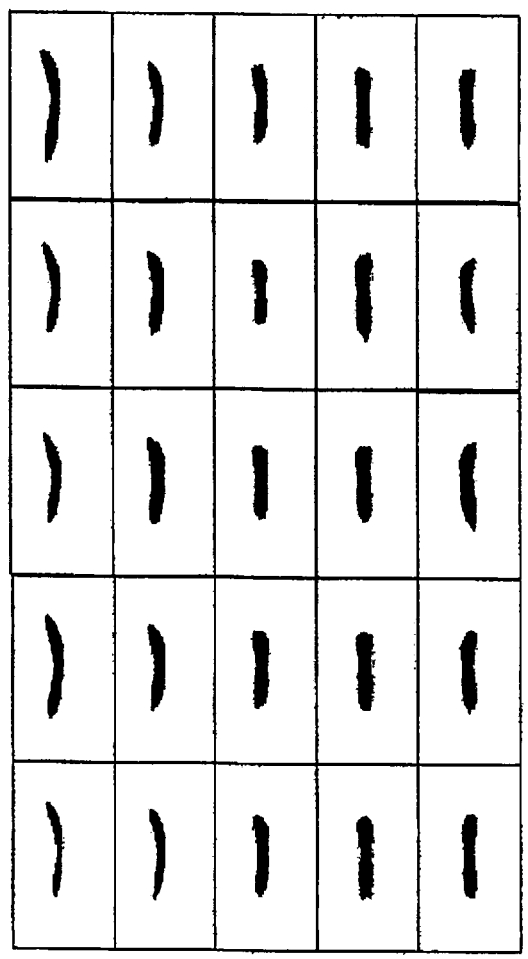
FIG. 4 shows images, captured with an optical array, of a region in which particles of the powdery material meet from different directions from a nozzle of a powder feed, with different alignments of the fed powder flow in relation to a laser beam.

FIG. 4 shows real images of a region 9 that are captured with a camera as an optical detector array 7 and that can be assessed with an electronic evaluation device and used for the adjustment. The captured image shown in the very center has been obtained for example in the case of a completely correct adjustment. For all the other captured images, there were more or less deviations from the optimum target adjustment, which can be seen from the shape, the size and/or length in the z-axis direction.

If the adjustment is not correct, curved and/or asymmetric images can be captured and taken into account in the evaluation. Such curved and/or asymmetric images can be seen in particular in the two outer gaps.

Figure 3:
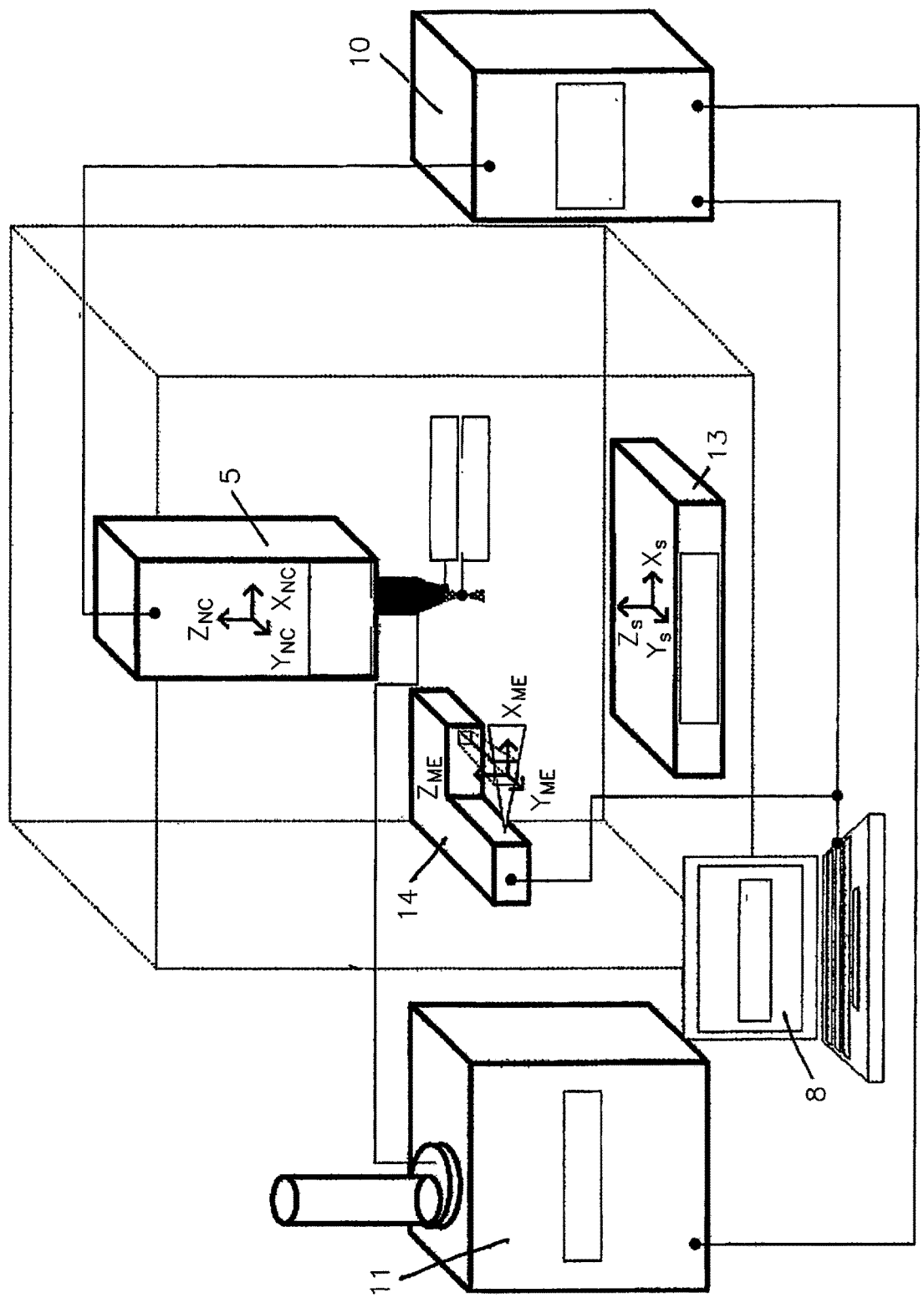
FIG. 3 shows a schematic illustration of an example of a setup which is designed for laser deposition welding and an integrated measurement unit.

FIG. 3 shows, in a schematic form, a complete example of a setup for laser powder deposition welding with a working head 5 in which optical components for shaping a laser beam 4 and protective elements for the optical components (not shown) are accommodated. The working head 5 can be moved at least in two degrees of freedom by means of an electronic controller 10 in order to coat defined regions of a workpiece (not shown), which can be arranged on a carrier 13. From a powder conveyor 11, powdery material is fed by means of a gas flow via a line 12 to the working head and, therein, to the annular gap nozzle 1. The powder exits from the annular gap nozzle 1, as is shown in FIGS. 1 and 2.

This example includes a measurement unit 14 in which the optical detector array 7 and a radiation source 6 are accommodated. The optical detector array 7 is connected to the electronic evaluation unit 8.

The radiation source 6 and possibly a reflective element are arranged in the measurement unit 14 in such a way that a linear beam 6.1 emitted by the radiation source 6 is directed into a region 9. The linear beam 6.1 is aligned in a plane which is oriented perpendicular to the linear beam (6.1), that is to say in the z-axis direction in the case of a Cartesian coordinate system.

The sensitive surface of the optical detector array 7 is oriented or arranged in a plane that is oriented parallel to it. This is not necessarily the case if a reflective element is arranged between the region 9 and the optical detector array 7, as was described in the general part of the description, in the beam path between the region 9 and the optical detector array 7. A reflective element can also be arranged between the region 9 and the radiation source 6. The installation space required can be reduced as a result.

A bandpass filter which is transparent for wavelengths between 715 nm and 780 nm can be arranged upstream of the optical detector array 8.

The linear beam 6.1 can be emitted with electromagnetic radiation having a wavelength of 760 nm.

The laser beam 4 can have a wavelength of 1064 nm. During the adjustment, it is typically operated with a maximum of 15% of its normal operating power during laser deposition welding. This is sufficient to heat particles of the powdery material which are arranged in the region 9 during the capturing of an image to a temperature such that they emit electromagnetic radiation in the wavelength range in which the bandpass filter is transparent, and thus a spatially resolved capturing of image points that correspond to the resolution of the optical detector array 7 is possible with the optical detector array 7. Only image points that exceed a specifiable intensity threshold value are used here for the adjustment.

The measurement signals captured with the optical detector array 7, which each correspond to an image, are fed to the electronic evaluation unit 8.

In a form not shown, images of the region 9 can be captured successively, and a translational relative movement can take place between the working head 5 and the radiation source 6 or the measurement unit 14. They can be moved in a translational manner relative to each other. The linear beam 6.1 is moved here perpendicular to its direction of radiation and in the process penetrates the entire region 9 from one side to an opposite side. In this way, the center of the region 9, in which the region has its smallest extent in this plane, can be irradiated in any case. At least the image of the region 9 that was captured in the center of the region 9 with the optical detector array 7 should be used for the adjustment in the evaluation.

FIG. 3 does not show a device for the two-dimensional alignment of the powder feed in relation to the central longitudinal axis of the laser beam 4. Said powder feed can be arranged at the working head 5 and can be designed as in the general part of the description and can also be operated thus during the adjustment.

Figure 5:
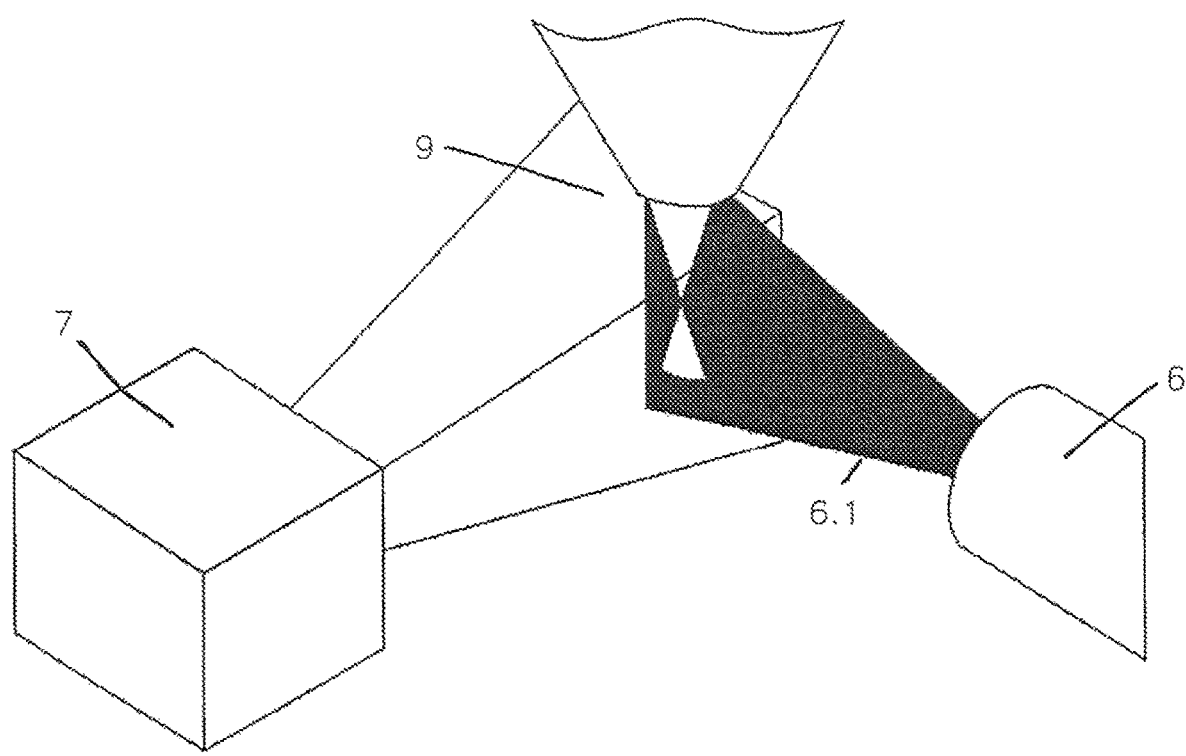
FIG. 5 shows a perspective illustration of the arrangement of a two-dimensional detector array, which can capture a region in which particles of the powdery material meet from different directions from a nozzle of a powder feed, and the region is illuminated with a linear beam.

FIG. 5 is intended to illustrate the irradiation of the region 9 and the capturing of measurement signals with the optical detector array 7. The linear beam 6.1 is emitted by a radiation source 6, in particular a laser radiation source, and is radiated into the region 9 with parallel alignment with respect to the z-axis. With the optical detector 7, the sensitive surface of which is oriented parallel to the emission direction of the linear beam 6.1, the image of the region 9 is captured in a spatially resolved manner, and the measurement signals captured in a spatially resolved manner are then transmitted from the optical detector 7 to the electronic evaluation unit 8, in which the evaluation for the adjustment, as explained in the general part of the description, can be carried out.

The invention claimed is:

1. An apparatus for adjusting a powder flow in relation to the central longitudinal axis of an energy beam of a laser beam for a working head designed for powder deposition welding, wherein
   the powder flow by means of a powder feed arranged on the side of the working head that faces a workpiece and is formed with an annular gap nozzle is embodied to be conical in the direction of the workpiece, with a plurality of annularly arranged nozzles or with at least two oppositely arranged nozzles inclined at an angle and the exit openings of which face one another, and designed such that particles of powdery material meet from several directions at an acute angle in a region which is arranged above a surface on which the powdery material melted from the energy of the energy beam is to be deposited, and
   the energy beam is aligned with respect to the plane on which molten powdery material is to be deposited, and
   a device for two-dimensional or three-dimensional alignment of the powder feed in relation to the central longitudinal axis of the energy beam, specifically the optical axis of a laser beam, is provided at the working head in a plane oriented perpendicular to the central longitudinal axis of the energy beam,
   from a radiation source, electromagnetic radiation is directed as a linear beam from a side into the region in which the particles of the powdery material meet, and
   an optical two-dimensional detector array is arranged in a plane that is perpendicular to the linear beam,
   the optical two dimensional detector arrayspatially captures intensities of the electromagnetic radiation and
   is connected to a computer programmed to function as an electronic evaluation unit which
   determines the shape, size and/or length of an irradiated region in which intensities that exceed a specifiable threshold value have been captured with the optical two-dimensional detector array in a spatially resolved manner and,
   the irradiated region extends from surfaces of particles of the powdery material which the laser beam, which is operated with reduced power during the adjustment, strikes a partial region of the irradiated region that is in the direction of the particles of the powdery material accelerated towards a workpiece surface, in which the particles of the powdery material heated by the laser beam move divergently.

2. The apparatus as claimed in claim 1, wherein the radiation source emits electromagnetic radiation in a wavelength interval and/or a bandpass filter that is transparent for the wavelength interval is arranged between the irradiated region and the optical two-dimensional detector array, wherein the respective wavelength interval lies in the range from 700 nm to 1200 nm.

3. The apparatus as claimed in claim 2, wherein the wavelength of a laser beam that is used as the energy beam lies outside the wavelength interval and the wavelength(s) of the linear beam lie/lies within the wavelength interval.

4. The apparatus as claimed in claim 1, wherein the energy beam is operated during an adjustment with reduced power compared to that used in powder deposition welding, which is sufficient to heat particles in an interaction zone with the energy beam but melting of the particles of the powdery material is avoided.

5. The apparatus as claimed in claim 1, wherein the radiation source with a linear beam movable parallel to the plane in which the optical two-dimensional detector array is arranged and a spatially resolved capturing and evaluation of intensities during the movement is carried out at least in a region of the center of the region in which the particles of the powdery material meet using the electronic evaluation unit.

6. The apparatus as claimed in claim 1, wherein the electronic evaluation unit can be used for manual adjustment with apparatus for two-dimensional alignment of the particles of powdery material feed and/or the electronic evaluation unit is designed such that a controlled, automated adjustment of the apparatus for two-dimensional alignment of the particles of powdery material feed can be obtained.

7. The apparatus as claimed in claim 1, wherein the electronic evaluation unit is programmed so a number of individual captured image points at which the specifiable intensity threshold value has been exceeded and that were captured within the irradiated region are ascertained and evaluated,
   and/or a pattern recognition, taking into account an optimum pattern, is carried out with the image points detected within the irradiated region.

8. The apparatus as claimed in claim 1, wherein apparatus for two-dimensional alignment of the particles of powdery material feed in relation to the central longitudinal axis of the energy beam is formed with two platforms that are movable independently of one another in two directions aligned perpendicularly to one another and to which the particles of powdery material feed and/or
   an optical unit displacing the energy beam parallel to its central longitudinal axis is fixed and/or a
   device for the three-dimensional alignment of the particles of powdery material feed in relation to the central longitudinal axis of the energy beam has additional movement perpendicular to the movable platforms.

9. The apparatus as claimed in claim 8, wherein the two platforms are each movable with a linear drive with a stepper motor, and are controllable by the electronic evaluation unit.

* * * * *